(12) United States Patent
Tammam

(10) Patent No.: US 8,819,210 B2
(45) Date of Patent: Aug. 26, 2014

(54) MULTI-TENANT INFRASTRUCTURE

(75) Inventor: Ariel Tammam, Ramat Gan (IL)

(73) Assignee: SAP Portals Israel Ltd, Ra'anana (IL)

( * ) Notice: Subject to any disclaimer, the term of this patent is extended or adjusted under 35 U.S.C. 154(b) by 280 days.

(21) Appl. No.: 13/312,356

(22) Filed: Dec. 6, 2011

(65) Prior Publication Data
US 2013/0145006 A1    Jun. 6, 2013

(51) Int. Cl.
*G06F 15/173* (2006.01)

(52) U.S. Cl.
USPC .............. 709/223; 709/201; 709/202

(58) Field of Classification Search
CPC ...... H04L 67/10; H04L 63/10; H04L 67/1002
USPC .......................... 709/223, 201, 202
See application file for complete search history.

(56) References Cited

U.S. PATENT DOCUMENTS

| | | |
|---|---|---|
| 2007/0130130 A1 | 6/2007 | Chan et al. |
| 2009/0282045 A1 | 11/2009 | Hsieh et al. |
| 2009/0288084 A1 | 11/2009 | Astete et al. |
| 2010/0031253 A1 | 2/2010 | Adams et al. |
| 2011/0213870 A1* | 9/2011 | Cai et al. ................ 709/223 |
| 2011/0271278 A1 | 11/2011 | Dittrich |
| 2011/0307695 A1* | 12/2011 | Slater .................... 713/163 |
| 2012/0096271 A1* | 4/2012 | Ramarathinam et al. ..... 713/172 |
| 2012/0174085 A1* | 7/2012 | Driesen et al. ............. 717/168 |

OTHER PUBLICATIONS

Engelsen, Nathaniel. "Multi-Tenant Architecture via Dependency Injection." Jul. 11, 2010. Tallan's Technology Blog, parts 1-3. Retrieved from http://blog.tallan.com/2010/07/11/multi-tenant-architecture-via-dependency-injection-part-1/.*

* cited by examiner

*Primary Examiner* — Nicholas Taylor
(74) *Attorney, Agent, or Firm* — Fish & Richardson P.C.

(57) ABSTRACT

Methods, systems, and apparatus, including computer programs encoded on a computer storage medium, for providing a multi-tenant infrastructure. In one aspect, a method includes establishing a plurality of tenant containers for a plurality of tenants, each tenant container being a logical separation of data and functionality for a multi-tenant application, each tenant container being isolated from the other tenant containers. A request is received from a client device. The request is determined to be associated with one of the tenant containers. The request is directed to the tenant container associated with the request.

17 Claims, 1 Drawing Sheet

MULTI-TENANT INFRASTRUCTURE

TECHNICAL FIELD

The present disclosure relates to software, computer systems, and computer implemented methods for providing a multi-tenant infrastructure.

BACKGROUND

Software applications can be provided over a network (e.g., the Internet) by a system of one or more computers. Software as a service, for example, is a way of providing software applications by hosting the applications on the Internet. A system of computers hosts the software by executing the software and storing its associated data. Users access the system using, for example, a web browser or other thin client.

Applications can serve various client organizations. For example, a business application can serve different customers, which can be different people or different businesses. Multi-tenancy is a way of serving various client organizations ("tenants"). For a conventional application using multi-tenancy, a single instance of the application runs on a server, instead of having separate application instances or hardware systems for different tenants.

SUMMARY

In general, one aspect of the subject matter described in this specification can be embodied in methods that include the actions of establishing a plurality of tenant containers for a plurality of tenants, each tenant container being a logical separation of data and functionality for a multi-tenant application, each tenant container being isolated from the other tenant containers; receiving a request from a client device; determining that the request is associated with one of the tenant containers; and directing the request to the tenant container associated with the request, including executing the multi-tenant application using the tenant container and the request. Other embodiments of this aspect include corresponding systems, apparatus, and computer programs, configured to perform the actions of the methods, encoded on computer storage devices. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

These and other embodiments can each optionally include one or more of the following features. Establishing the plurality of tenant containers includes establishing a tenant identifier for each container; and determining that the request is associated with one of the tenant containers includes determining that the request includes the tenant identifier for the associated tenant container. Establishing the plurality of tenant containers comprises receiving tenant information from client devices associated with each tenant, and wherein the tenant information includes one or more of: a name, login credentials for a plurality of accounts, one or more application preferences, and payment information. Establishing the plurality of tenant containers comprises using an injection dependency framework. Each tenant container is associated with an executing virtual machine to execute the multi-tenant application.

The actions further comprise executing, with a single thread, the multi-tenant application for a first tenant container and, at a later time, the multi-tenant application a second tenant container. The multi-tenant application is designed to be reentrant.

Particular embodiments of the subject matter described in this specification can be implemented so as to realize none, one, or more of the following advantages. A multi-tenant application can use a multi-tenant infrastructure that, compared to conventional multi-tenant applications, reduces computing resources, for example, because separate process or thread is not needed for each tenant, a separate application instance is not needed for each tenant, and a separate class loader is not needed for each tenant. Libraries of executable software can be added to the multi-tenant infrastructure, which can make it easier for application developers to create multi-tenant applications that rely on those libraries. A multi-tenant application can be executed in a virtual machine. A multi-tenant application can be designed to be reentrant or non-reentrant. By using a multi-tenant infrastructure, an application developer need only make minimal changes for the application to be hosted as a multi-tenant application.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
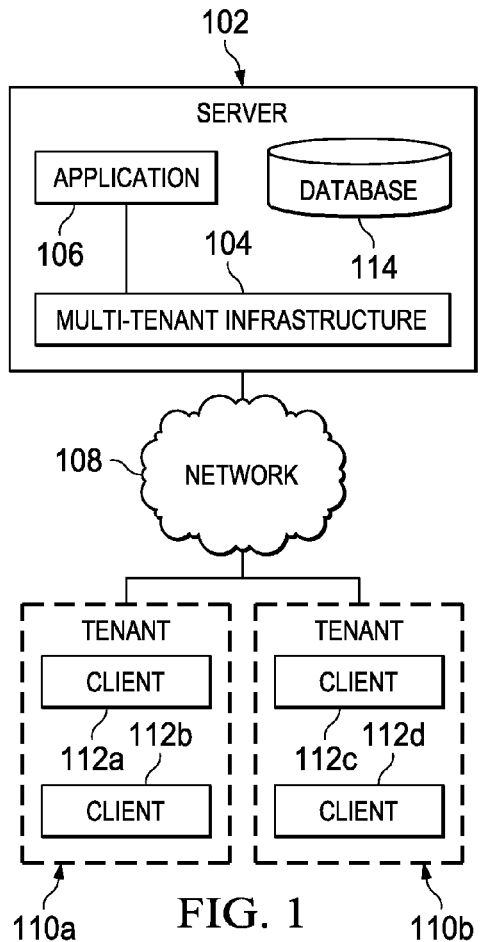
FIG. 1 illustrates an example server configured to host one or more applications using a multi-tenant infrastructure.

FIG. 1 illustrates an example server 102 configured to host one or more applications 106 using a multi-tenant infrastructure 104. The server 102 can be implemented, for example, in a system of one or more computers.

The server 102 communicates over a computer network 108 (e.g., the Internet) with various tenants 110*a-b*. Each tenant 110 is a client organization, e.g., a person or a business. One or more client devices 112*a-d* is associated with each tenant 110. A client device 112 is, for example, a computer or a mobile device. A user, using a client device 112, can access the application 106. For example, the user can access the application 106 using a web browser executing on a client device 112.

At a high level, the application 106 can be any application, program, module, process, or other software that may execute, change, delete, generate, or otherwise manage information according to the present disclosure, particularly in response to and in connection with one or more requests received from the illustrated clients 112. While illustrated as internal to server 102, one or more processes associated with the application 106 may be stored, referenced, or executed remotely. For example, a portion of an application 106 can be a web service associated with the application that is remotely called, while another portion of the application 106 can be an interface object or agent bundled for processing at a client 112.

The application 106 can be a business application, for example, an application for accounting, customer relationship management (CRM), enterprise resource planning (ERP), invoicing, human resource management (HRM), content management (CM). The application 106 can be a social networking application, for example, for entertainment of the users of a tenant 110, or for improving productivity and connectivity between users of a tenant 110, or both.

The application 106 supports the tenants 110a-b using a multi-tenant infrastructure 104. Using the multi-tenant infrastructure 104, a single instance of the application 106 executes on the server 102, serving the tenants 110. The multi-tenant infrastructure 104 enables multi-tenant capability in the application 106 so that an application developer can focus on the application's core functionality (e.g., CRM, ERP, HRM, social networking) and not on adapting the application to serve multiple tenants.

The multi-tenant infrastructure 104 is typically implemented as instructions that when executed by one or more computers cause the computers to perform operations for supporting multiple tenants 110. For example, the multi-tenant infrastructure 104 can be implemented in one or more libraries of executable software. The libraries can include various software routines. An application developer can design the application 106 to call one or more of the routines in supporting multiple tenants 110. In operation, when the server 102 is executing the application 106, the server 102 is executing the application 106 software and the software of the multi-tenant infrastructure 104. The application 106 and the multi-tenant infrastructure 104 operate in concert to provide the application's core functionality and support multiple tenants 110.

Tenants' data can be stored, for example, in a database 114. In some implementations, the tenants' data is stored in separate databases. In some other implementations, the tenants' data is stored in a common database 114, with each tenant having its own set of tables that are grouped into a schema created specifically for the tenant. In some other implementations, the tenants' data is stored in the same database 114 and the same set of tables. For example, a given table can include records from multiple tenants stored in any appropriate order, and a tenant identification column can associate every record with its respective tenant. The multi-tenant infrastructure 104 can support all of these strategies for storing tenants' data without changing the application 106 source code.

The multi-tenant infrastructure 104 can support the application 106 to be reentrant or non-reentrant. Hence, an application developer using the multi-tenant infrastructure is not forced to design the application 106 to be non-reentrant. In the case where the application 106 source code is non-reentrant, the state of a tenant is defined by the application 106 source code, and the multi-tenant infrastructure 104 allocates application code for each tenant. If the application 106 executes successfully for a single tenant, then it can also execute successfully for multiple tenants with the multi-tenant infrastructure 104.

Figure 2:
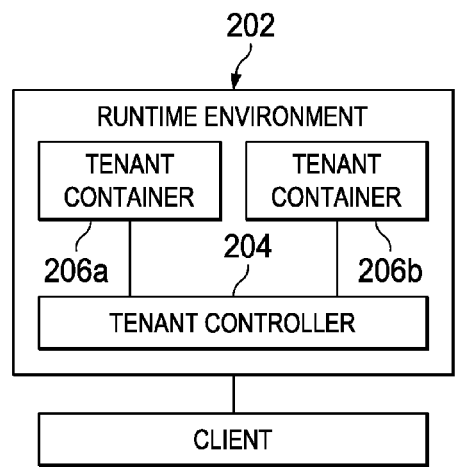
FIG. 2 is a conceptual diagram of an example runtime environment of an application using a multi-tenant infrastructure.

FIG. 2 is a conceptual diagram of an example runtime environment 202 of an application using a multi-tenant infrastructure (e.g., the application 106 and multi-tenant infrastructure 104 of FIG. 1). The runtime environment 202 includes data and functionality that are logically separated and can be implemented, for example, in software modules executed by a server (e.g., the server 102 of FIG. 1).

In the example runtime environment 202, a tenant controller 204 directs requests to tenant containers 206a-b. A container 206 is a logical separation of data and functionality between tenants 110. The multi-tenant infrastructure 104 can create a separate container 206 for each tenant 110. Each container 206 can be associated with a tenant identifier.

For example, the separate containers can be implemented using a dependency injection framework that creates a micro container for each tenant and groups dependent applications, services, and libraries without causing interference between tenants. The containers can be separated to support business application security. Computing resources can be shared between tenants; for example, a single executing thread can serve multiple tenants, one at a time. Physical memory and a processor can also be shared between tenants.

A request can be, for example, a Hypertext Transfer Protocol (HTTP) request from a client device 208. The request can include a cookie that specifies user details, including a tenant identifier, or the tenant can be determined based on the cookie. The tenant controller directs requests to specific tenant containers 206, e.g., using the tenant identifier in a request, or using other attributes of the request. Each tenant container 206 can have associated executing software. For example, each tenant container 206 can include an executing virtual machine running an application.

Figure 3:
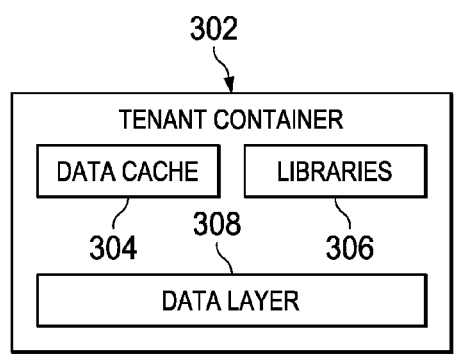
FIG. 3 is a conceptual diagram of an example tenant container for an application.

FIG. 3 is a conceptual diagram of an example tenant container 302 for an application. The tenant container includes a data cache 304, one or more libraries 306, and a data layer 308.

The data cache 304 can be, for example, a software cache that stores frequently used data for the tenant. Suppose that the application is a business application that frequently provides reports with employment data. The employment data can be stored in the data cache 304.

The libraries 306 can include, for example, software routines for Object-relational mapping (ORM), software for creating a cache (e.g., data cache 304), or software for handling requests from the Internet (e.g., HTTP requests). The libraries can be provided by the multi-tenant infrastructure 104 of FIG. 1.

The data layer 308 provides simplified access for the application to data stored, for example, in a database (e.g., the database 114 of FIG. 1). For example, the data layer 308 can return an instance of an object (including both data and instructions relating to the data) rather than just providing raw data from the database. The data layer 308 can be implemented using the libraries 306.

Figure 4:
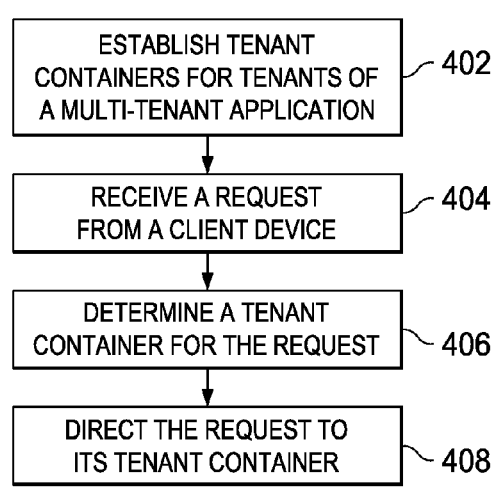
FIG. 4 is a flow diagram of an example process for executing an application that serves multiple tenants using a multi-tenant infrastructure.

FIG. 4 is a flow diagram of an example process 400 for executing an application that serves multiple tenants using a multi-tenant infrastructure. The process 400 is performed by a system of one or more computers. For example, the process can be performed by the server 102 of FIG. 1.

The system establishes tenant containers for each tenant (step 402). Establishing the tenant containers can include establishing a tenant identifier for each container, for example, a unique name or number. Establishing the tenant containers can include receiving tenant information from client devices associated with each tenant. For example, tenants can provide a name, login credentials for a number of accounts, application preferences, payment information, and so on. The tenant containers can be established using an injection dependency framework.

The system receives a request from a client device of a first tenant (step 404). The request can be, for example, an HTTP request sent over the Internet. The request can include an embedded tenant identifier.

The system determines the tenant container for the request by analyzing the request (step 406). For example, if the request includes a tenant identifier, the system can determine the tenant container for the request by comparing the request's tenant identifier with the tenant identifiers of the tenant containers. In another example, the system compares a network address of the request (e.g., an Internet Protocol (IP) address) with a list of approved addresses for each tenant. In a further example, the system determines the tenant container using user credentials in a single sign-on (SSO) scenario, e.g., where a name and login credentials are shared between a number of applications. The system can determine a tenant container for the request using various other techniques.

The system directs the request to its tenant container (step 408). The multi-tenant application executes using the tenant container and the request. For example, if the multi-tenant application is a business application and the request is a request for a report, the multi-tenant application can generate the report and send a response including the report. The multi-tenant application executes in isolation from the other tenant containers. Each tenant container can host multiple applications and group them together yet provide isolation from other tenants.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a system of one or more computers, the method comprising:
   establishing a plurality of tenant containers for a plurality of tenants of a multi-tenant application implemented on a multi-tenant infrastructure based on a dependency injection framework, the multi-tenant infrastructure implemented in a plurality of libraries of executable software being grouped based on the dependency injection framework, each tenant container being a logical separation of data and functionality for a multi-tenant application, each tenant container being isolated from the other tenant containers;
   receiving a first request from a first client device;
   determining that the first request is associated with a first tenant container of the tenant containers;
   directing the first request to the first tenant container associated with the first request;
   in response to directing the first request to the first tenant container associated with the first request, executing, with a single thread, the multi-tenant application using the first tenant container and the first request;
   receiving a second request different from the first request from a second client device;
   determining that the second request is associated with a second tenant container of the tenant containers that is different than the first tenant container;
   directing the second request to the second tenant container associated with the second request; and
   in response to directing the second request to the second tenant container associated with the second request, executing, with the single thread executing the multi-tenant application for the first tenant container, the multi-tenant application using the second tenant container and the second request.

2. The method of claim 1, wherein
   establishing the plurality of tenant containers includes establishing a first tenant identifier for the first tenant container, and a second tenant identifier for the second tenant container,
   determining that the first request is associated with the first tenant container of the tenant containers includes determining that the first request includes the first tenant identifier for the first tenant container, and
   determining that the second request is associated with a second, differing tenant container of the tenant containers includes determining that the second request includes the second tenant identifier for the second tenant container.

3. The method of claim 1, wherein establishing the plurality of tenant containers comprises receiving tenant information from client devices associated with each tenant, and wherein the tenant information includes one or more of: a name, login credentials for a plurality of accounts, one or more application preferences, and payment information.

4. The method of claim 1, wherein each tenant container is associated with an executing virtual machine to execute the multi-tenant application.

5. The method of claim 1, wherein the multi-tenant application is designed to be reentrant.

6. A system of one or more computers configured to perform operations comprising:
   establishing a plurality of tenant containers for a plurality of tenants of a multi-tenant application implemented on a multi-tenant infrastructure based on a dependency injection framework, the multi-tenant infrastructure implemented in a plurality of libraries of executable software being grouped based on the dependency injection framework, each tenant container being a logical separation of data and functionality for a multi-tenant application, each tenant container being isolated from the other tenant containers;

receiving a first request from a first client device;

determining that the first request is associated with a first tenant container of the tenant containers;

directing the first request to the first tenant container associated with the first request in response to directing the first request to the first tenant container associated with the first request, executing, with a single thread, the multi-tenant application using the first tenant container and the first request;

receiving a second request different from the first request from a second client device;

determining that the second request is associated with a second tenant container of the tenant containers that is different than the first tenant container;

directing the second request to the second tenant container associated with the second request; and in response to directing the second request to the second tenant container associated with the second request, executing, with the single thread executing the multi-tenant application for the first tenant container, the multi-tenant application using the second tenant container and the second request.

7. The system of claim 6, wherein establishing the plurality of tenant containers includes establishing a first tenant identifier for the first tenant container, and a second tenant identifier for the second tenant container, determining that the first request is associated with the first tenant container of the tenant containers includes determining that the first request includes the first tenant identifier for the first tenant container, and determining that the second request is associated with a second, differing tenant container of the tenant containers includes determining that the second request includes the second tenant identifier for the second tenant container.

8. The system of claim 6, wherein establishing the plurality of tenant containers comprises receiving tenant information from client devices associated with each tenant, and wherein the tenant information includes one or more of: a name, login credentials for a plurality of accounts, one or more application preferences, and payment information.

9. The system of claim 6, wherein each tenant container is associated with an executing virtual machine to execute the multi-tenant application.

10. The system of claim 6, wherein the multi-tenant application is designed to be reentrant.

11. A non-transitory computer storage medium encoded with a computer program, the program comprising instructions that when executed by one or more computers cause the one or more computers to perform operations comprising:

establishing a plurality of tenant containers for a plurality of tenants of a multi-tenant application implemented on a multi-tenant infrastructure based on a dependency injection framework, the multi-tenant infrastructure implemented in a plurality of libraries of executable software being grouped based on the dependency injection framework, each tenant container being a logical separation of data and functionality for a multi-tenant application, each tenant container being isolated from the other tenant containers;

receiving a first request from a first client device;

determining that the first request is associated with a first tenant container of the tenant containers;

directing the first request to the first tenant container associated with the first request;

in response to directing the first request to the first tenant container associated with the first request, executing, with a single thread, the multi-tenant application using the first tenant container and the first requests;

receiving a second request different from the first request from a second client device;

determining that the second request is associated with a second tenant container of the tenant containers that is different than the first tenant container;

directing the second request to the second tenant container associated with the second request; and in response to directing the second request to the second tenant container associated with the second request, executing, with the single thread executing the multi-tenant application for the first tenant container, the multi-tenant application using the second tenant container and the second request.

12. The non-transitory computer storage medium of claim 11, wherein establishing the plurality of tenant containers includes establishing a first tenant identifier for the first tenant container, and a second tenant identifier for the second tenant container, determining that the first request is associated with the first tenant container of the tenant containers includes determining that the first request includes the first tenant identifier for the first tenant container, and determining that the second request is associated with a second, differing tenant container of the tenant containers includes determining that the second request includes the second tenant identifier for the second tenant container.

13. The non-transitory computer storage medium of claim 11, wherein establishing the plurality of tenant containers comprises receiving tenant information from client devices associated with each tenant, and wherein the tenant information includes one or more of: a name, login credentials for a plurality of accounts, one or more application preferences, and payment information.

14. The non-transitory computer storage medium of claim 11, wherein each tenant container is associated with an executing virtual machine to execute the multi-tenant application.

15. The non-transitory computer storage medium of claim 11, wherein the multi-tenant application is designed to be reentrant.

16. The method of claim 1, wherein each of the first and the second tenant containers comprise a data cache, one or more libraries, and a data layer, and the data cache stores frequently used data for the respective tenant container, the one or more libraries comprise software routines, and the data layer provides access to a database.

17. The method of claim 16, wherein the software routines comprise software routines for Object-relational mapping (ORM), creating the data cache, or handling HTTP requests.

* * * * *